United States Patent [19]

Le Marchand et al.

[11] Patent Number: 4,920,951
[45] Date of Patent: May 1, 1990

[54] GAS-FIRED HEATING DEVICE

[75] Inventors: Alain Le Marchand, Villaines Sous Bois; Francis Moumaneix, Le Raincy, both of France

[73] Assignee: Guilbert-Express, Paris, France

[21] Appl. No.: 321,073

[22] Filed: Mar. 9, 1989

[30] Foreign Application Priority Data

Mar. 11, 1988 [FR] France .................... 88 03217

[51] Int. Cl.⁵ .............................. B44B 7/02
[52] U.S. Cl. ................... 126/403; 126/406; 126/413
[58] Field of Search .............. 126/402–409, 126/413, 414

[56] References Cited

U.S. PATENT DOCUMENTS 3,905,755 9/1975 Aske .
4,119,088 10/1978 Sim ........................... 126/413
4,805,593 2/1989 Hsu .......................... 126/414

FOREIGN PATENT DOCUMENTS 1114012 4/1956 France .
2398965 2/1979 France .
1524185 9/1978 United Kingdom .
87/07549 12/1987 World Int. Prop. O. .

Primary Examiner—Carroll B. Dority
Attorney, Agent, or Firm—Dennison, Meserole, Pollack & Scheiner

[57] ABSTRACT

A gas-fired heating device suitable for burning animal horns comprises a burner body and an external casing which is part of the burner body. A heating tip is heated by a flame in the burner body and the external casing is arranged and adapted to prevent flames escaping from the burner body and foreign bodies entering the burner body. The device is held by means of a handle which may be adapted to accommodate a replaceable gas storage reservoir.

30 Claims, 3 Drawing Sheets

GAS-FIRED HEATING DEVICE

BACKGROUND OF THE INVENTION

1. Field of the invention

The invention concerns a gas-fired heating device particularly suitable for burning the horns of livestock animals.

2. Description of the prior art

The horns of horned livestock animals such as cattle and sheep are periodically burned to limit their growth and prevent accidents. The devices used for this comprise a handle, a heat source and a nozzle heated by the heat source. The nozzle has a cup-shaped surface which is substantially a surface of revolution about the axis of the handle. To burn a horn the nozzle of the device is fitted over the end of the horn and the device is rotated on itself by manipulating the handle.

Some devices of this kind are electrically operated and function at the AC line voltage (220 V, for example), electrical safety being procured either by a ground connection or by double insulation. In the former case it is necessary to provide at a reasonable distance from the place of use an electrical power socket outlet with a proper ground connection, which is not always available in farms. Also, as the electrical power cord of these devices is relatively short it is generally necessary to use an extension cable and this must incorporate a ground conductor. Even if all these conditions can be met, there is still the risk of electrical connections being made in a humid environment or even in water. Finally, movements of the animals may pull out or break the wires.

The same constraints and the same hazards apply in the case of double-insulated devices, except for those resulting from the necessity for a ground connection.

For these reasons the European standards organizations are considering a ban on the marketing of devices of this kind.

There are also electrical devices operating from a low-voltage (24 V) supply and therefore requiring a voltage-reducing transformer. Once again, an electrical power supply is needed. The electrical safety problems are solved provided that the transformer is connected directly to the AC line supply, with no intermediate junction points in a humid environment. However, the presence of the transformer significantly increases the cost of the product, all the more so in that the standards organizations require the transformer to be splashproof.

Finally, there are gas-fired devices which connect to a gas cylinder via a pressure regulator and a hose. A device of this kind can be used at places where there is no fixed power supply. However, these devices do require a gas cylinder and a pressure regulator which, if acquired specifically for this application, increase the cost of the equipment. The weight of the cylinder also tends to limit its mobility. The device produces a flame which projects to the exterior of the device and therefore constitutes a fire hazard.

An object of the invention is to eliminate the disadvantages of the known devices and to provide an inexpensive, self-contained device that is totally mobile and eliminates virtually all risk of accidents.

Another object of the invention is to provide a gas-fired heating device offering relatively high power and a relatively high operating temperature combined with compact overall dimensions and therefore good handiness while preventing any excessive heating of the handle.

SUMMARY OF THE INVENTION

In one aspect the invention consists in a gas-fired heating device comprising a handle, a burner body, an external casing which is part of the burner body, means on the external casing to prevent flames escaping from the burner body and foreign bodies entering the burner body, and a heating tip adapted to be heated by a flame in the burner body.

In a preferred embodiment of the invention the means preventing flames escaping from the burner body and foreign bodies entering the burner body comprise a plurality of orifices the dimensions of which are adapted to prevent penetration by a cylindrical rod with a diameter greater than 0.9 mm.

In one preferred embodiment the burner body comprises a mixer, a perforated tubular structure extending in an axial direction between the securely fixed to the mixer and the tip, and delimiting a flame area within it, the ratio of the area of the perforations to the total surface area of the tubular structure being relatively high, and wherein the external casing is perforated, the ratio of the area of the perforations to the total surface area of the external casing is relatively low and the external casing is attached to the mixer and to a forward part of the tubular structure.

The tubular structure advantageously comprises a perforated tube and the ratio of the area of the perforations to the total surface area of the tubular structure is greater than 30%. The external casing may have a tubular wall comprising one or more openings and the device then further comprises mesh or perforated grids fitted to the opening or openings by virtue of which the ratio of the area of the perforations to the total surface area of the external casing is less than 15%. The tubular wall advantageously comprises a plurality of substantially axial openings in a small number of circumferentially delimited areas and extending in the circumferential direction over a relatively small portion of the circumference of the tubular wall.

The device may further comprise at least one igniter hole in the tubular wall, preferably to the rear of the one or more openings in the tubular wall. It may further comprise at least one hollow rivet with an inside diameter of at least 2.5 mm and a tubular fine screen attached to the tubular wall by the hollow rivet or rivets, the arrangement being such that there is a respective hollow rivet as aforesaid in each igniter hole or a single hollow rivet as aforesaid in the single igniter hole.

The igniter hole (or each igniter hole) is preferably to the rear of the flame area.

In one embodiment of the invention the tubular wall has a reduced diameter portion at one or both ends and/or the device further comprises an annular baffle attached to the mixer and to the tubular structure and adapted to center one end of the tubular wall.

The annular baffle is preferably located to the rear of the device and surrounds the mixer which includes air inlets to the rear of the baffle.

The annular baffle preferably includes a divergent rim with a diameter larger than that of the tubular wall which extends rearwardly in the immediate vicinity of the air inlets.

In one embodiment of the invention the bush of the tubular structure fits over the mixer and extends beyond the latter in the downstream direction, an annular compartment being defined between the mixer and the bush forwardly of the area in which they are joined together, and the device further comprises lateral openings in the mixer whereby the annular compartment communicates with the interior of the mixer and a flange projecting radially outwards from the mixer, delimiting the annular compartment towards the front and being adapted to allow gas to flow in the forward direction from the annular compartment.

The device advantageously comprises an injector and a filter in the form of a porous cylinder accommodated with radial clearance in a bore in the injector and pressed forwardly and in a fluid-tight way against a shoulder in the bore by crimping it by means of a deformed lip on the injector.

The device may also include a stand extending radially from the body and enabling the device to be put down in an inclined position with the tip directed upwards.

In one embodiment of the invention the burner body comprises heat barrier means adapted to prevent transfer of heat by conduction between the tip and the handle. The heat barrier means may comprise annular grooves in the mixer adapted to reduce locally its effective transverse cross-section.

In one specific embodiment of the invention the maximum power consumption of the device is in excess of 180 W, the maximum working temperature of the tip is in excess of 400° C., the ratio of the maximum power consumption to the minimum distance between any point on the tip and any point on the handle is in excess of 1,400 W/m and the maximum surface temperature of the handle is 45° C.

More specifically, the maximum power consumption may be in excess of 250 W and the ratio of the maximum power consumption to the minimum distance between any point on the tip and any point on the handle may be in excess of 2,000 W/m.

The respective diameters (or largest transverse dimensions if non-circular) of the burner body and the handle are preferably in a ratio between 0.5 and 1.4.

One specific embodiment of the invention further comprises an intermediate assembly between the handle and the burner body and a gas supply control knob on the intermediate assembly and in this device the handle and the intermediate assembly are made at least in part from a material or materials adapted to resist transfer of heat by conduction between the burner body and the hand of a person holding the handle.

The handle may be made from metal coated with a thermally insulative material, for example in epoxy resin paint. Surprisingly enough, this kind of paint gives less sensation of heat at the same temperature than other insulative materials, quite apart from its pleasant esthetic effect.

The part of the intermediate assembly near the burner body is preferably made from steel containing at least 16% chromium and includes openings adapted to reduce locally its effective transverse cross-section.

In one embodiment of the invention the diameter or largest transverse dimension of the intermediate assembly is less than that of the handle and less than that of the burner body and the control knob does not project beyond an imaginary surface joining the contours of the respective ends of the handle and the burner body facing towards the intermediate assembly.

The handle and the burner body (and the intermediate assembly where applicable) are preferably substantially coaxial. This is particularly so in the case of devices for burning the horns of animals.

The handle is advantageously hollow and adapted to accommodate replaceable gas storage means.

Other characteristics and advantages of the invention will emerge from the following detailed description of one embodiment given by way of non-limiting example only with reference to the appended diagrammatic drawings.

DESCRIPTION OF THE PREFERRED EMBODIMENT

Figure 1:
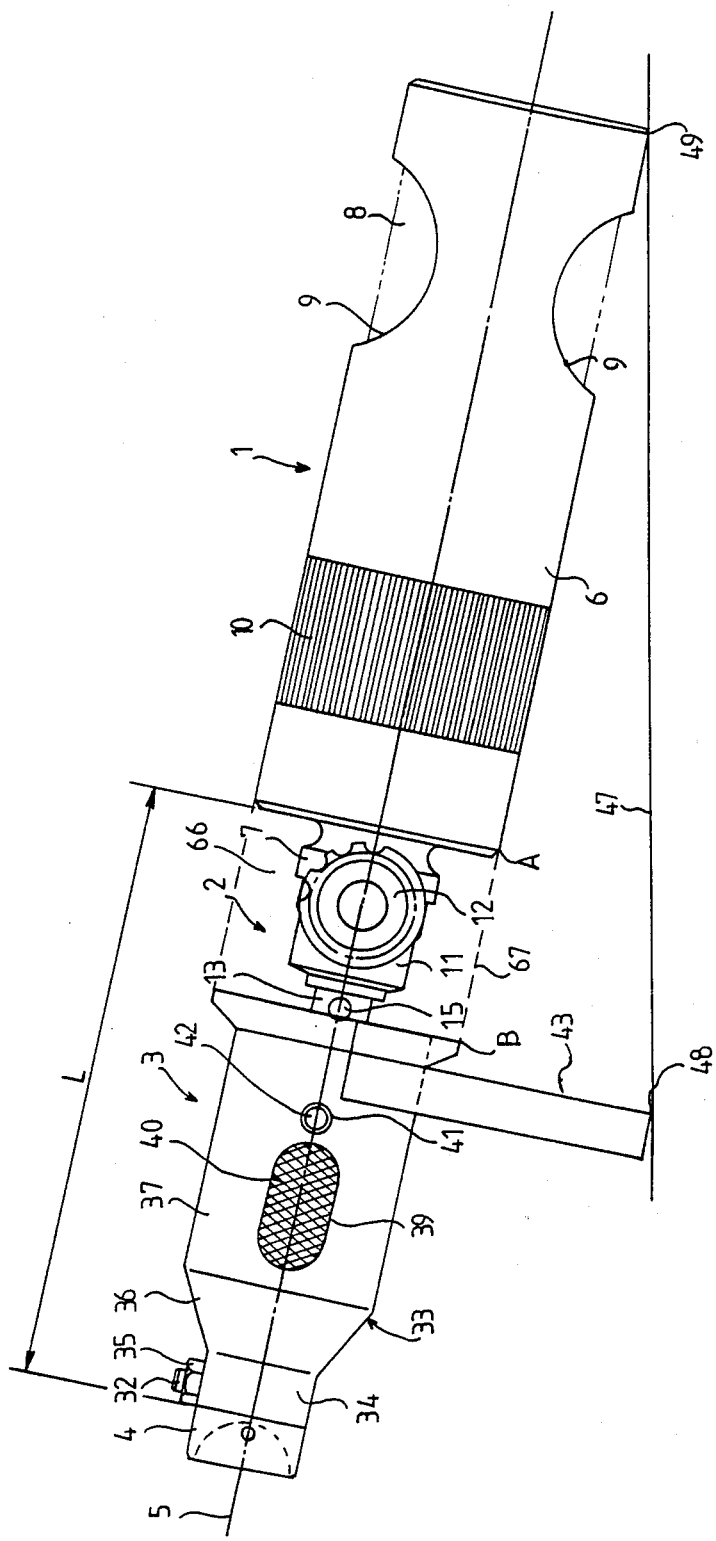
FIG. 1 is a view in elevation of a gas-fired heating device in accordance with the invention resting on a horizontal surface.
Figure 2:
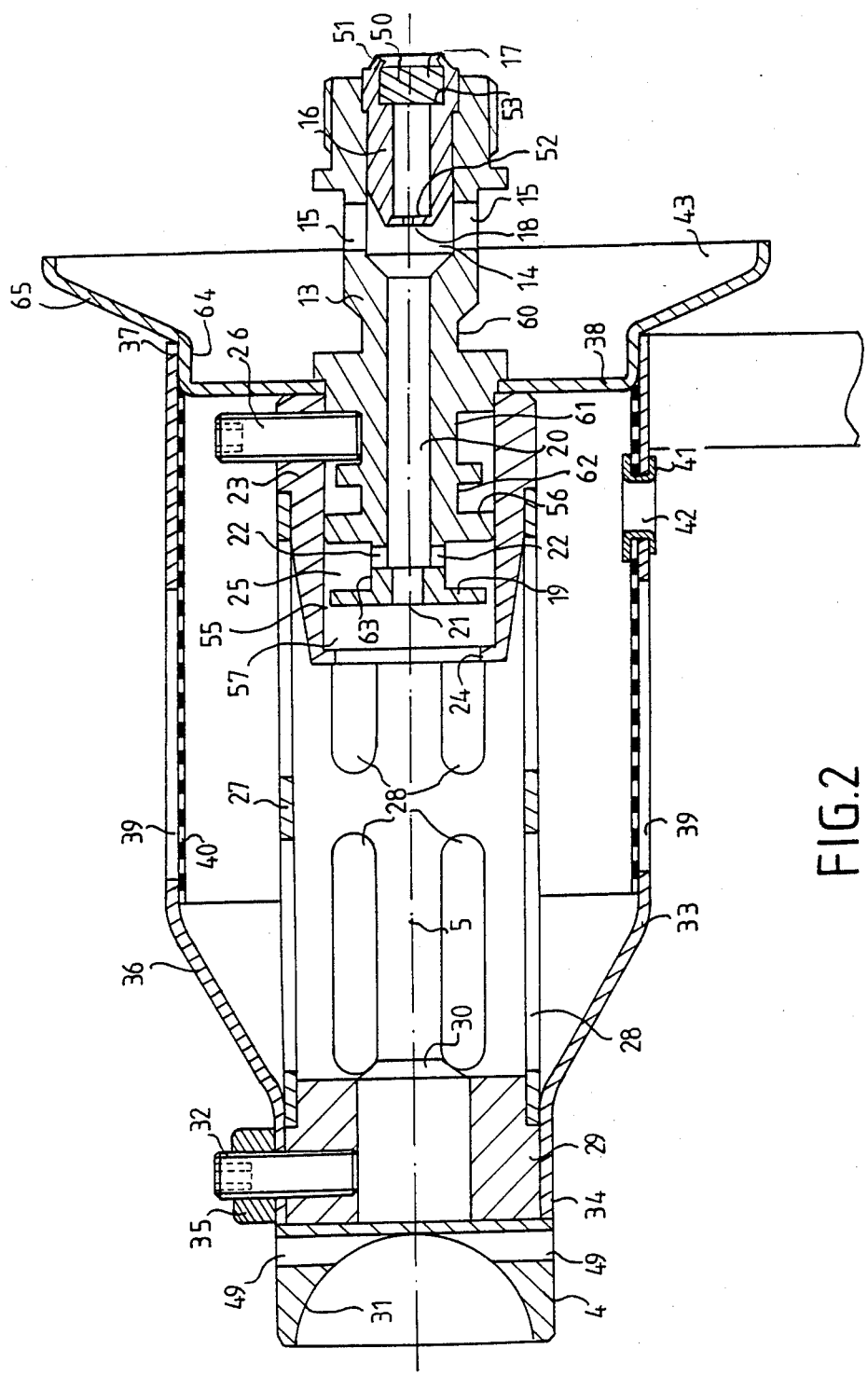
FIG. 2 is a view in axial cross-section of a burner body and a heating tip of the device from FIG. 1.
Figure 3:
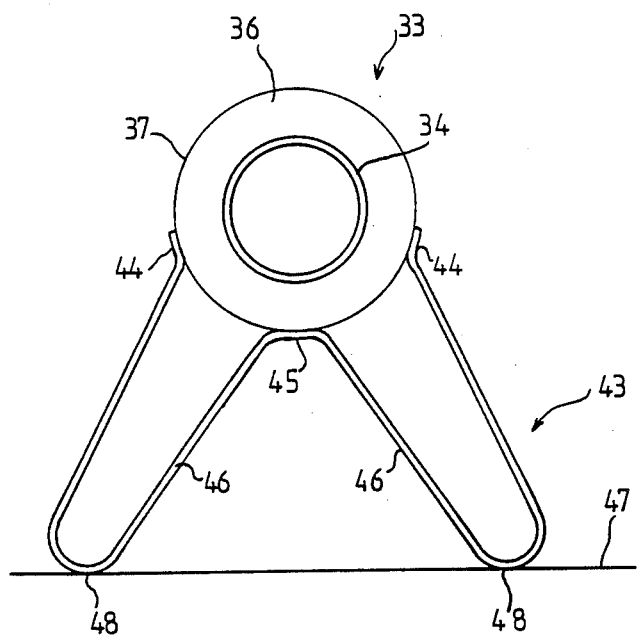
FIG. 3 is an end view of an external casing of the burner body and a stand.

The device shown in FIG. 1 includes a handle 1, an intermediate assembly 2 forming a valve, a burner body 3 and a heating tip 4 arranged in this order along an axis 5, the handle 1, the burner body 3 and the tip 4 being substantially bodies of revolution about this axis. The handle 1 includes a tubular wall 6 enclosed at one end by a bottom plate 7 onto which can be screwed a gas cartridge 8 entirey contained within the tube 6. The latter features two openings 9 through which the cartridge can be manipulated to screw it on and unscrew it. Over part of its length the tube 6 has a longitudinally ribbed area 10 to provide a better grip.

The intermediate assembly 10 includes a valve body 11 also screwed to the bottom plate 7 of the handle and provided with means (not shown) for opening a gas outlet valve of the cartridge when the latter is fitted. On the valve body is mounted a control knob 12 for opening and closing the gas flow passage and adjusting the flowrate.

The intermediate assembly 2 also includes the rear part of a stainless steel tubular mixer 13 extending along the axis 5 and screwed at one end to the valve body 11. The mixer 13 further extends into the interior of the burner body 3. The axial bore 20 of the mixer 13 includes an increased diameter inlet portion 14 communicating with the exterior through air inlet orifices 15 which pass through the wall of the mixer 13. To the rear of the orifices 15 this portion 14 receives a brass injector 16 which carries at its rear end a filter 17 on the gas flow path, the forward end of the injector having a small hole 18 for injecting the gas formed in a transverse wall 52 of the injector. The filter 17 is in the form of a porous cylinder and is accommodated with radial clearance in an enlarged rear portion 50 of the axial bore. It is pushed forward against a shoulder 53 delimiting the part 50 by means of a clamping lip 51 provided on the injector. The radial clearance prevents particles that could block the injection hole being rubbed off when inserting the filter. Any particles that may be present are trapped by the clamping of the filter against the shoulder 53. Immediately forward of the portion 14 of the bore the tube 13 has an annular groove 40 on its outside peripheral surface.

The forward end of the mixer 13, which is inside the burner body 3, forms a flange 19 projecting radially outwards. The axial bore 20 of the mixer opens axially at 21 forward of the flange 19 and radially at orifices 22 to the rear of the latter in an annular groove 63. A steel bush 23 surrounds the mixer 13 and extends beyond the forward end 21 of the latter in the forward direction. The outside diameter of the mixer 13 is slightly less than the inside diameter of the bush 23 at the location of the flange 19, substantially less than this diameter at the openings 22 and substantially equal to the inside diameter of the bush at the location of a flange 56 delimiting the groove 63 towards the rear. The gas-air mixture formed in the bore 20 can exit the latter through its forward end 21 to enter a compartment 57 situated between the flange 19 and forward end 24 of the bush 23. This mixture can also exit the bore 20 through the radial openings 22 to enter an annular compartment 25 situated between the flanges 19 and 26. The compartments 25 and 57 are in communication by way of an annular gap 55 between the periphery of the flange 19 and the bush 23. This annular gap could be replaced with perforations through the flange 19 which could equally well comprise an independent disk fixed to the mixer 13. The bush 23 is immobilized on the mixer 13 by a grubscrew 26 threaded into a radial hole in the bush and entering an annular groove 61 between two flanges of the mixer.

A mild steel rigid tube 27 which is a body of revolution about the axis 5 is spot welded to the exterior of the bush 23. Extending forwards from the bush, this tube is made from perforated sheet formed to shape and spot butt welded. The perforations 28 in the tube 27 are elongate in the axial direction and their surface area amounts to approximately 40% of the total surface area of the tube.

The external lateral surface of a steel ring 29 which is a body of revolution about the axis 5 is spot welded to the forward end of the tube 27. Into the bore in this ring is inserted a rear part 30 of the heat conducting material tip 34 which has to the front a substantially hemispherical cup-shape 31 into which opens at least one radial hole 49 for removal of the smoke produced by burning horns. The tip is removably fastened by a grubscrew 32 threaded into a radial screwthreaded hole in the ring 29 with its end bearing against the part 30. The latter projects rearwardly relative to the ring and in operation is adjacent the forward end of the flame produced by the device so as to collect most of the energy thereof. The tube 27, the bush 23 and the ring 29 form a rigid tubular structure fastening the tip to the mixer and consequently to the intermediate assembly 2 and to the handle 1.

The body 3 is delimited laterally by a mild steel shroud 33 a cylindrical front end portion 34 of which fits around the forward end of the tube 27 and the ring 29. The screw 32 passes through this portion 34 which is held against the ring by a nut 35 threaded onto the screw 32 and locking the latter. Joined to the cylindrical part 34, towards the rear, are a frustoconical portion 36 and then another cylindrical portion 37 of larger diameter which extends over the major part of the tube 27 and to the rear about as far as the air inlet openings 15 in the mixer 13. The burner body is closed at the rear by a mild steel disk 38 including an axial opening by means of which it is fitted over the mixer 13, being trapped in the axial direction between the rear flange of the latter and the rear end of the bush 23. The disk 38 is accommodated within the cylindrical portion 37 of the shroud 33, near its rear end. At its edge it is extended towards the rear by a cylindrical rim 64 over which fits the rear end of the portion 37 which is thus centered. Beyond the end of the shroud the rim 64 merges with a divergent frustoconical portion 65 the diameter of which increases towards the rear from the maximum diameter of the cylinder and which terminates in line with the air inlet openings 15.

The large diameter portion of the shroud incorporates two axially elongate openings 39 in diametrally opposite positions. Their surface area is small in relation to the total surface area of the shroud and in particular in relation to the lateral surface area of the combustion chamber defined by the shroud 33, the ring 29, the tip part 30, the disk 38 and the mixer 13. Although the two diametrally opposed openings would seem to constitute an optimum arrangement it is possible to replace them with a single elongate opening or by more than two elongate openings, although this number should remain small. Also, the elongate opening or openings can be replaced by a multiplicity of openings substantially aligned with the axial direction. In any event, the total width occupied by the openings in the circumferential direction must be small in relation to the circumference of the portion 37. This is lined internally with a tubular grid 40 which extends beyond the openings 39 in both longitudinal directions and which extends to the rear as far as the disk 38. The grid 40 is formed by a stainless steel rectangular contour screen that is formed to shape and spot welded to itself with an overlap. The portion 37 and the grid 40 have two respective orifices facing each other and facing the mixer 13, and therefore to the rear of the end 24 of the bush 23. These holes accommodate a hollow rivet 41 which fastens the two parts together. This avoids the difficulties associated with welding parts of different thickness. The interior of the hollow rivet 41 provides a passage 42 between the combustion chamber and the exterior of the device. The cross-section of this passage must be at least 12 mm$^2$ if the power consumption is greater than 250 W.

Associated with the burner body 3 is a stand 43 formed by a steel strip welded at its two ends 44 and at its middle region 45 to three places on the circumference of the portion 37 of the shroud 33, at its rear end. Between the region 45 and each of the ends 44 this strip forms a U-shape 46 directed radially outwards and extending to a distance from the axis 5 greater than the outside radius of the handle 1. The device can therefore be put down in a stable manner on a horizontal surface 47 by means of the two support points 48 respectively provided by the two U-shapes 46 and a third point 49 provided by the rear end of the handle 1. In this position the tip 4 is directed obliquely upwards.

The welded stand may be replaced by a removable or foldable stand. Instead of a stand fixed to the body there may be provided a support fastened to a receiving surface forming part (for example) of a metal carrying case for the device. This prevents the device being put down directly on a flammable material such as straw.

The advantages resulting from the specific configuration of the device as described will emerge from the following description of how it functions.

The device is initially oriented with the burner body 3 higher than the handle 1, for example in the position shown in FIG. 1. Given the orientation that has just been explained, when the valve 2 is opened dry gas is injected via the hole 18 into the bore 20 of the mixer 13 and entrains so-called primary air which enters through the openings 15 and with which it is homogeneously mixed. The mixture reaches the internal chamber of the burner body 3 (the combustion chamber) through the passages 21, 22, 55 and 24. The annular region of the chamber surrounding the bush 23 is a calm area in which the gas mixture can readily be ignited by an external flame offered up to the orifice 42. An axial flame is then formed between the burner 13, 23 on the one hand and the part 30 of the tip 4, on the other hand, so heating the tip. After the gas has been burning for a few tens of seconds the heat transmitted from the tip to the burner body via the ring 29 and the tube 27 is sufficient to raise the temperature of the injector 16 to the point where the tip can be oriented downwards, the liquified gas contained in the cartridge 8 and flowing out under gravity being vaporized as it passes into the metal filter 17 before passing through the injection hole 18 and therefore not disturbing the flame. Excessive return flow of heat is nevertheless prevented by the fact that the tube 27, which is welded to the ring 29 and to the bush 23 and therefore in heat conductive relationship to them, is itself a poor conductor of heat because of the large surface area occupied by the openings 28 and because of the localized reductions in the effective transverse cross-section of the mixer tube produced by the groove 63, the orifices 22, the groove 61, an annular groove 62 between the grooves 61 and 63 and also the groove 60 and the air entry openings 15. The shroud 33 has a relatively high thermal conductivity given the small surface area occupied by the openings 39. Its thermal contact with the ring 29 is mediocre and it is joined to the burner body only through the intermediary of the disk 38, to which it is not positively fastened. The shroud therefore makes only a very small contribution to the transmission of heat from the tip to the burner body.

The disk 38 closes the combustion chamber at the rear in a way which although it is not fluid-tight is nevertheless sufficient to prevent the burned gases approaching the air inlet openings 15 and being aspirated thereinto in the normal operating position with the tip downwards. The divergent portion 65 formed integrally with the disk 38 drives the burned gases even further away from the openings 15. The arrangement of the openings 39 in two diametrally opposed circumferentially narrow areas prevents the formation of an ascending tubular column of burned gases which would prevent access of fresh air to the openings 15.

The grid 40 has lozenge-shaped openings with angles of 60°, the parallel sides of which are 0.9 mm apart. The grid 40 is therefore able to prevent penetration by a cylindrical rod with a diameter exceeding 0.9 mm. This limits the risk of flammable particles, especially straws, entering the combustion chamber. Also, openings this small prevent virtually all escape of flames, even under windy conditions. Of course, the same results could be achieved by replacing the grid openings with elongate slots along the axis of the burner body and with a width not exceeding 0.9 mm, which slots may be provided directly in the shroud 33 is place of the relatively wide openings 39.

The orifice 42 does not allow flames to escape either, as it faces the bush 23 and is therefore to the rear of the flame area. This arrangement limits the risk of straws reaching the flame area.

In addition to the advantages already explained, the device as described provides high thermal power output from compact overall dimensions without excessive heating of the surface of the handle in contact with the operator.

The device consumes a power P between 500 and 700 W, depending on the operating conditions, and the distance L between the rear end of the tip 4, which is raised to a temperature of approximately 600° C., and the front end of the handle is only 0.125 m. The ratio P/L is therefore between 4,000 and 5,600 W/m. Even so, the surface of the handle 1 is raised to a temperature of only about 37° C., which is not uncomfortable for the user.

The shortness of the distance L makes the device very handy, unlike similar devices previously available. This handiness is also aided by an appropriate ratio between the diameter of the burner body (ignoring the divergent portion 65 which is of restricted length) and the diameter of the handle 1 which in this instance is approximately 0.75.

Note also that the diameter of the valve body 11 is significantly less than that of the handle 1 and that of the burner body 3, so that there is an annular space 66 around the intermediate assembly 2 within an imaginary surface 67 (which is in this instance a surface of revolution) joining the front end A of the handle and rear end B of the burner body. The control knob 12 is accommodated within this annular space 66 and is therefore protected should the device be dropped, for example.

The handle 1 is made from metal and is externally coated in its tubular part 6 with stoved epoxy resin paint. This paint provides additional thermal insulation and gives a remarkable comfortable "feel".

The invention is not limited to devices for burning the horns of animals. Other applications include devices for branding animals, hot marking devices in general and soldering irons.

Depending on the application, the handle and the burner body need not necessarily be aligned along the same axis. Also, the handle is not necessarily in the shape of a body of revolution, and does not necessarily accommodate a replaceable gas reservoir.

There is claimed:

1. Gas-fired heating device comprising a handle, a burner body, an external casing which is part of said burner body, means on said external casing adapted to prevent flames escaping from said burner body and foreign bodies entering said burner body, and a heating tip adapted to be heated by a flame in said burner body, said burner body including a mixer, a perforated tubular structure extending in an axial direction between and securely fixed to said mixer and said tip, and a flame area within it, the ratio of the area of the perforations to the total surface area of said tubular structure being relatively high, and wherein said external casing is perforated, the ratio of the area of the perforations to the total surface area of said external casing is relatively low and said external casing is attached to said mixer and to a forward part of said tubular structure.

2. Device according to claim 1 wherein said means comprise a plurality of orifices the dimensions of which are adapted to prevent penetration by a cylindrical rod with a diameter greater than 0.9 mm.

3. Device according to claim 1 wherein said tubular structure comprises a perforated tube and said ratio of the area of the perforations to the total surface area of said tubular structure is greater than 30%.

4. Device according to claim 3 further comprising a bush attached to said mixer and a ring adapted to accommodate said tip and wherein said perforated tube is welded at one end to said bush and at the opposite end to said ring.

5. Device according to claim 1 wherein said external casing has a tubular wall comprising one or more openings and further comprising mesh or perforated grids fitted to said opening or openings by virtue of which said ratio of the area of the perforations to the total surface area of said external casing is less than 15%.

6. Device according to claim 5 wherein said tubular wall comprises a plurality of substantially axial openings in a small number of circumferentially delimited areas and extending in the circumferential direction over a relatively small portion of the circumference of said tubular wall.

7. Device according to claim 5 further comprising at least one igniter hole is said tubular wall.

8. Device according to claim 7 wherein said at least one igniter hole is to the rear of said one or more openings in said tubular wall.

9. Device according to claim 7 further comprising at least one hollow rivet with an inside diameter of at least 2.5 mm and a tubular fine screen attached to said tubular wall by said at least one hollow rivet, the arrangement being such that there is a respective hollow rivet as aforesaid in each igniter hole or a single hollow rivet as aforesaid in the single igniter hole.

10. Device according to claim 7 wherein said at least one igniter hole is to the rear of said flame area.

11. Device according to claim 5 wherein said tubular wall has a reduced diameter portion at one end.

12. Device according to claim 5 further comprising an annular baffle attached to said mixer and said tubular structure and adapted to center one end of said tubular wall.

13. Device according to claim 12 wherein said baffle is located towards the rear of the device and surrounds said mixer which includes air inlets to the rear of said baffle.

14. Device according to claim 13 wherein said annular baffle includes a divergent rim with a diameter larger than that of said tubular wall which extends rearwardly in the immediate vicinity of said air inlets.

15. Device according to claim 4 wherein said bush fits over said mixer and extends beyond the latter in the forward direction and an annular compartment is defined between said mixer and said bush forwardly of the area in which they are joined together, and further comprising lateral openings in said mixer whereby said annular compartment communicates with the interior of said mixer and a flange projecting radially outwards from said mixer, delimiting said annular compartment towards the front and being adapted to allow gas to flow in the forward direction from said annular compartment.

16. Device according to claim 1 wherein said burner body comprises heat barrier means adapted to prevent transfer of heat by conduction between said tip and said handle.

17. Device according to claim 1 wherein said burner body comprises heat barrier means adapted to prevent transfer of heat by conduction between said tip and said handle, said heat barrier means comprising annular grooves in said mixer adapted to reduce locally its effective transverse cross-section.

18. Device according to claim 1 wherein the maximum power consumption of the device is in excess of 180 W, the maximum working temperature of said nozzle is in excess of 400° C., the ratio of the maximum power consumption to the minimum distance between any point on said tip and any point on said handle is in excess of 1,400 W/m and the maximum surface temperature of said handle is 45° C.

19. Device according to claim 18 wherein said maximum power consumption is in excess of 250 W and said ratio of the maximum power consumption to the minimum distance between any point on said tip and any point on said handle is in excess of 2,000 W/m.

20. Device according to claim 1 wherein the respective diameters or largest transverse dimensions of said burner body and said handle are in a ratio between 0.5 and 1.4.

21. Gas-fired heating device comprising a handle, a burner body, an external casing which is part of said burner body, means on said external casing adapted to prevent flames escaping from said burner body and foreign bodies entering said burner body, and a heating tip adapted to be heated by a flame in said burner body, an intermediate assembly between said handle and said burner body and a gas supply control knob on said intermediate assembly and wherein said handle and said intermediate assembly are made at least in part of a material or materials adapted to resist transfer of heat by conduction between said burner body and the hand of a person holding said handle.

22. Device according to claim 21 wherein said handle is made from metal coated with a thermally insulative material.

23. Device according to claim 22 wherein said thermally insulative material is an epoxy resin paint.

24. Device according to claim 21 wherein the part of said intermediate assembly near said burner body is made from steel containing at least 16% chromium and includes hollows adapted to reduce locally its effective transverse cross-section.

25. Device according to claim 21 wherein the diameter or largest transverse dimension of said intermediate assembly is less than that of said handle and less than that of said burner body sand said control knob does not project beyond an imaginary surface joining the contours of the respective ends of said handle and said burner body facing towards said intermediate assembly.

26. Device according to claim 1 wherein said handle and said burner body are substantially coaxial.

27. Device according to claim 21 wherein said intermediate assembly, said handle and said burner body are substantially coaxial.

28. Gas-fired heating device comprising a handle, a burner body, an external casing which is part of said burner body, means on said external casing adapted to prevent flames escaping from said burner body and foreign bodies entering said burner body, and a heating tip adapted to be heated by a flame in said burner body, and wherein said handle is hollow and adapted to accommodate replaceable gas storage means.

29. Gas-fired device for burning animal horns comprising a handle, a burner body, an external casing which is part of said burner body, means of said external casing adapted to prevent flames escaping from said burner body and foreign bodies entering said burner body, and a tip adapted to be heated by a flame in said burner body, wherein said handle and said burner body are coaxial, and said burner includes a mixer, a perforated tubular structure extending in an axial direction between and securely fixed to said mixer and said tip, and a flame area within it, the ratio of the area of the perforations to the total surface area of said tubular structure being relatively high, and wherein said external casing is perforated, the ratio of the area of the perforations to the total surface area of said external casing is relatively low and said external casing is attached to said mixer and to a forward part of said tubular structure.

30. Gas-fired device for burning animal horns comprising a handle, a burner body, an external casing which is part of said burner body, means of said external casing adapted to prevent flames escaping from said burner body and foreign bodies entering said burner body, and a top adapted to be heated by a flame in said burner body, wherein said handle and said burner body are coaxial, an intermediate assembly between said handle and said burner body and a gas supply control knob on said intermediate assembly and wherein said intermediate assembly, said handle and said burner body are substantially coaxial and said handle and said intermediate assembly are made at least in part from a material or materials adapted to resist transfer of heat by conduction between said burner body and the hand of a person holding said handle.

* * * * *